United States Patent
Marais

(10) Patent No.: US 11,049,224 B2
(45) Date of Patent: Jun. 29, 2021

(54) AUTOMATED REAL-TIME HIGH DYNAMIC RANGE CONTENT REVIEW SYSTEM

(71) Applicant: Microsoft Technology Licensing, LLC, Redmond, WA (US)

(72) Inventor: Charles Claudius Marais, Duvall, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 128 days.

(21) Appl. No.: 16/211,003

(22) Filed: Dec. 5, 2018

(65) Prior Publication Data

US 2020/0184612 A1  Jun. 11, 2020

(51) Int. Cl.
| | |
|---|---|
| G06T 5/00 | (2006.01) |
| G06T 5/20 | (2006.01) |
| G06N 20/00 | (2019.01) |
| H04N 1/60 | (2006.01) |

(52) U.S. Cl.
CPC ............ G06T 5/008 (2013.01); G06N 20/00 (2019.01); G06T 5/20 (2013.01)

(58) Field of Classification Search
None
See application file for complete search history.

(56) References Cited

U.S. PATENT DOCUMENTS

| | | | |
|---|---|---|---|
| 5,706,093 A * | 1/1998 | Komiya | G01J 3/51 356/418 |
| 7,636,496 B2 | 12/2009 | Duan et al. | |
| 8,724,196 B2 | 5/2014 | Kobayashi | |
| 8,958,658 B1 | 2/2015 | Lim et al. | |
| 9,747,675 B2 | 8/2017 | Shibata et al. | |
| 2004/0066980 A1* | 4/2004 | Gindele | H04N 1/60 382/274 |
| 2005/0147298 A1* | 7/2005 | Gallagher | G06T 7/90 382/173 |

(Continued)

FOREIGN PATENT DOCUMENTS

| | | | | |
|---|---|---|---|---|
| EP | 3139344 A1 | | 3/2017 | |
| KR | 20170091824 | * | 8/2017 | ............... G06T 7/40 |

OTHER PUBLICATIONS

"Comprehensive Production Tool Solution for 4K/UHD, WCG and HDR Content Creation", Retrieved From https://www.tek.com/sites/default/files/media/media/resources/PRISM-ProductionTool-Set-Dataheet-2MW612480.pdf, Aug. 11, 2017, 12 Pages.

(Continued)

*Primary Examiner* — Beniyam Menberu
(74) *Attorney, Agent, or Firm* — Rainier Patents, P.S.

(57) ABSTRACT

Methods, systems and computer program products are described herein that enable the identification and correction of incorrect and/or inconsistent tones in the bright regions in an HDR image. A bright region is identified in an image. The bright region is classified into an assigned classification. A luminance value of the bright region is determined and compared to a predefined luminance values corresponding to the classification. The luminance value of the bright region is adjusted to match the predefined luminance values where there is a mismatch. Bright regions including mismatched or incorrect luminance values may be rendered on display to include a visual indicator that such regions include mismatched luminance values.

20 Claims, 6 Drawing Sheets

(56) References Cited

U.S. PATENT DOCUMENTS

| | | | |
|---|---|---|---|
| 2005/0226522 A1* | 10/2005 | Gallagher | G06K 9/00664 |
| | | | 382/254 |
| 2007/0177050 A1* | 8/2007 | Xiao | H04N 5/2351 |
| | | | 348/371 |
| 2010/0091119 A1 | 4/2010 | Lee | |
| 2011/0001859 A1* | 1/2011 | Matsuura | H04N 5/2354 |
| | | | 348/296 |
| 2012/0219218 A1 | 8/2012 | Demandolx | |
| 2013/0208994 A1* | 8/2013 | Shirata | G06T 5/008 |
| | | | 382/254 |
| 2013/0332866 A1 | 12/2013 | Johnson et al. | |
| 2014/0132769 A1* | 5/2014 | Kido | G06K 9/00791 |
| | | | 348/148 |
| 2016/0063305 A1* | 3/2016 | Matsunaga | G06T 5/005 |
| | | | 382/167 |
| 2016/0292834 A1 | 10/2016 | Tsuru et al. | |
| 2016/0292836 A1* | 10/2016 | Perry | G06F 3/04845 |
| 2017/0061592 A1* | 3/2017 | Reinhard | G06T 5/008 |
| 2017/0293800 A1* | 10/2017 | Babenko | G06K 9/6255 |
| 2018/0130188 A1 | 5/2018 | Farrell et al. | |
| 2019/0095742 A1* | 3/2019 | Fujimori | G06T 7/50 |
| 2019/0327410 A1* | 10/2019 | Urano | G06T 5/50 |
| 2020/0134343 A1* | 4/2020 | Yamaoka | G06K 9/4661 |

OTHER PUBLICATIONS

Williams, John, "HDR (High Dynamic range) using Google Nik HDR Efex Pro for tone-mapping", Retrieved From http://www.redlandscameraclub.org/docs/hdr%20info/hdr%20info.pdf, Oct. 5, 2018, 35 Pages.

Klein, et al., "Real-Time Compositing in Mixed Reality", Application as Filed in U.S. Appl. No. 16/004,250, filed Jun. 8, 2018, 64 Pages.

Funk, Nathan, "A Survey of Light Source Detection Methods", In Project Report of University of Alberta, Nov. 30, 2003, pp. 1-12.

Didyk, et al., "Enhancement of Bright Video Features for HDR Displays", In Journal of Computer Graphics Forum, vol. 27, Issue 4, Sep. 10, 2008, pp. 1265-1274.

"International Search Report and Written Opinion Issued in PCT Application No. PCT/US2019/063482", dated Feb. 26, 2020, 14 Pages.

* cited by examiner

300

400

AUTOMATED REAL-TIME HIGH DYNAMIC RANGE CONTENT REVIEW SYSTEM

BACKGROUND

"High dynamic range" (HDR) content refers to content (e.g., images, video) containing tones (brightness, deepness, or hue of a color shade) having a dynamic range (i.e., ratio between largest and smallest values) considered greater than standard dynamic range (SDR) (e.g., images/video rendered using a conventional gamma curve). Light sources and light reflections play a big role in the visual quality of HDR content. Therefore, when an HDR image includes features with unnatural and inconsistent luminance values, the visual quality of the image is diminished.

Some HDR content is "created" using content creation tools, and not captured by recording devices such as cameras. Examples of such creation scenarios include video games, and animated movies and visual effects ("VFX") in movies. HDR content may also by "auto-created" algorithmically. This type of HDR content is neither recorded nor manually created with content creation tools.

In many cases, HDR content is created and/or edited using SDR display devices. Video games, for example, have been producing HDR images in real-time for many years, with the first video game to utilize HDR lighting techniques as early as 1997. To view a game's real-time HDR images on an SDR display, the HDR values in these images first must be processed into a much smaller range of brightness and color values. Such processing is typically referred to as tone mapping. HDR displays are capable of native display of HDR content without the need for tone mapping, which naturally results better visual quality.

Until around 2015, however, all consumer display devices were SDR and incapable of natively displaying HDR content. Thus, the vast majority of consumers still have only SDR display devices. Moreover, the current low penetration of HDR displays (especially smaller sized displays that can easily fit onto a desk) means that even most video game content creators still use SDR display devices, and indeed, many content creation tools still do not support HDR display devices. In other words, most video game content is still mastered in SDR, including content that is HDR. As a result, during HDR content creation, such HDR content may include inadvertent use of unnatural and inconsistent luminance values for light sources and light reflections, because the game content creator cannot actually view the luminance values they are using that are native to HDR on the SDR display device used to create the HDR content. This can result in a lower quality HDR image when displayed on HDR capable display devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are described herein that enable detecting bright regions in HDR content that have incorrect and/or inconsistent tones, and automatically or manually correcting such tones. A bright region is identified in an image. The bright region is classified into an assigned classification. A luminance value of the bright region is determined and compared to predefined luminance values corresponding to the classification. The luminance value of the bright region is adjusted to match the predefined luminance values where there is a mismatch. Bright regions including mismatched or incorrect luminance values may be rendered on display to include a visual indicator that such regions include mismatched luminance values.

A manually input luminance correction may be received for such mismatched bright regions, or a correction may be automatically generated. Such correction may be applied to the HDR image to produce a corrected HDR image. Corrected luminance values may be generated that match another bright region with the same classification in the same image. In addition to generating corrections to incorrect luminance values, a scale adjustment may be applied to luminance values across the bright region to generate a scaled and adjusted luminance value.

Identification and classification of the bright regions of the image may be performed in various ways, such as by a suitably trained machine learning model. Such a model may be trained using images including bright regions having the classifications that may be employed in the HDR content (e.g., sun, moon, fires, explosions, specular highlights etc.). The predefined luminance values for each class of bright region may likewise be determined by a suitably trained machine learning model. Such a model would be trained not only with images of the expected classification, but also having luminance values is the desired range for such classification. Alternatively, predefined luminance values may be manually defined by a technical artist, game developer, other content creator, or other person.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
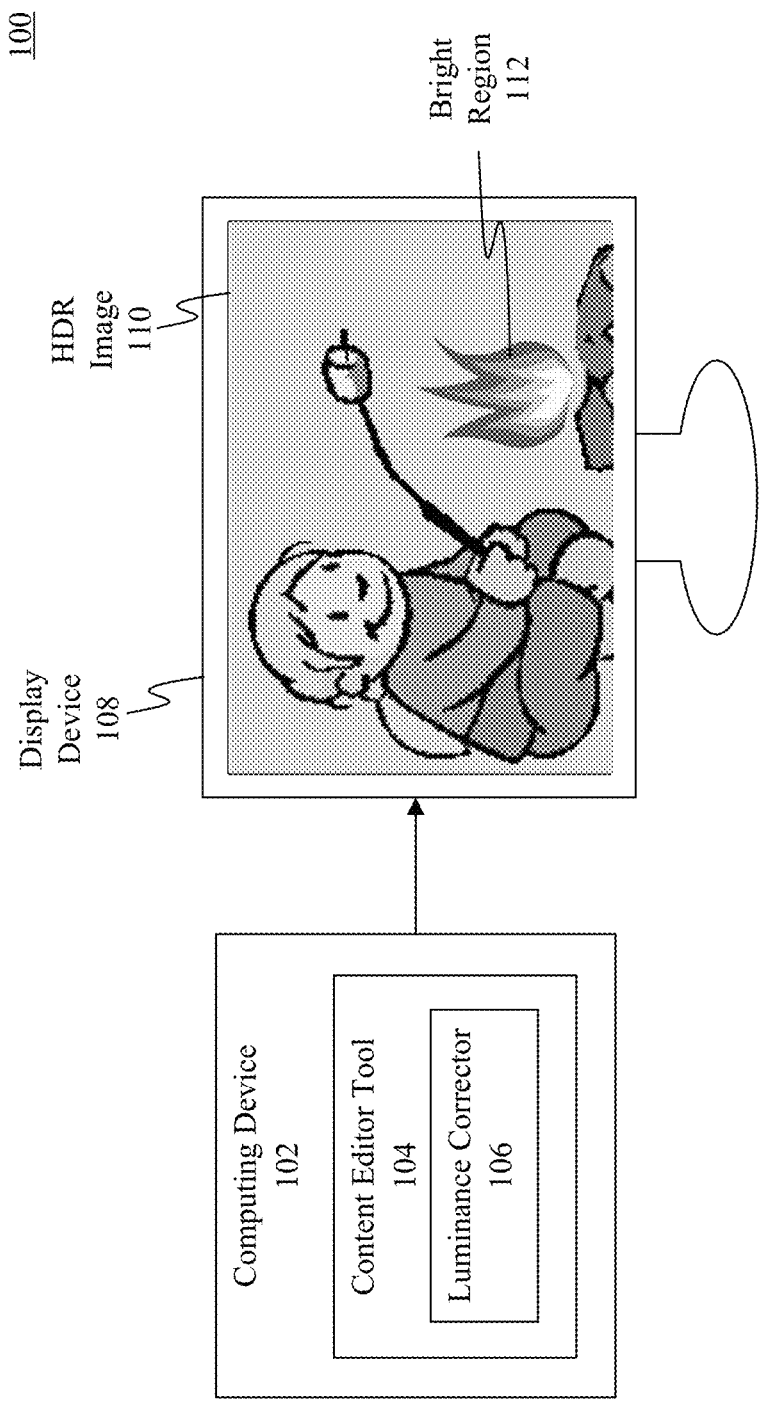
FIG. 1 depicts an example HDR content review system including an HDR luminance corrector, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As mentioned above, HDR content is often created using SDR display devices and in fact, most video game content today is created using SDR displays. In such case, during content creation, the content creator of HDR content cannot necessarily see the differences between tones on the SDR display, resulting in unnatural and inconsistent luminance values possibly being accidentally used for light sources and light reflections. This may result in a poor quality HDR image. In particular, a viewer of the content on an HDR display may view unexplained differences in tones between content features (e.g., two fires) displayed in a same image, degrading the image from the perspective of the viewer.

The design of HDR content on SDR display devices can lead to further problems. For instance, some content creation tools may unnaturally boost the luminance values of some image features by applying linear scalar values in order to accentuate certain light sources and visual effects (VFX). Still further, different content creators may use different luminance values for the same type of light sources and VFX. Examples are:

The reflection of the sun on water could be created brighter than the actual sun;

The light from a candle could be created brighter than an incandescent light;

Explosions could be created brighter in one game level than another level which was created by a different content creator; and The moon could be created brighter than a spot light, even though the moon is not emissive.

The end result is that even though the final image presented on an SDR display device may look correct, even with the inconsistent and unnatural luminance values included, the same image may look very unnatural and/or inconsistent on an HDR display device.

To correct these problems, content creators and producers spend a lot of extra time reviewing content, such as a video game, on different HDR displays to identify inconsistent and unnatural luminance values. In general, the entire review process is very time consuming. For example, in the case of a video game, content creators and producers have to play through most of the game levels, or in the case of a movie, most of the movie will have to be watched, and the video game or movie may not be completed in its entirety until long after the images contributed by a particular content creator/producer have been created. Subsequently created content for the video game or movie may be created with different luminance values. Accordingly, embodiments enable more efficient HDR content review and luminance correction that overcome these issues. A high-level overview of an HDR content reviewing process in a video game context, according to an example embodiment, is now be discussed.

The HDR content reviewing process begins with a graphic artist, game developer, or other content creator creating HDR content. Typically, the content creator selects one or more objects in a scene to be rendered with HDR luminance values, and defines the luminance values to be applied at run-time. After the creation of HDR objects in a scene is completed, the video game may be run with the newly created HDR content. At run-time within the video game, the luminance values defined during content creation may be applied to the HDR objects in the scene (and may also be used to render additional visual effects as required) to render a final HDR game image (i.e., the final image as displayed on the screen). Embodiments of an automated real-time HDR content reviewer may receive the final HDR game image and may operate as follows.

In an embodiment, the final HDR game image is input to a suitably trained machine learning model to identify the location, size, and luminance value of bright areas in the final HDR game image. In embodiments, the same machine learning model classifies such bright areas. That is, the model determines what each bright area is depicting with respect to a pre-identified category (i.e., a fire, sun, moon, headlight, etc.). Embodiments of the automated real-time HDR content-reviewer may then compare the determined luminance value for each bright area with a predefined luminance value corresponding to the determined classification. For example, in an embodiment, a list of predefined luminance values for various HDR object classifications may be provided to the automated real-time HDR content reviewer. A mismatch between the determined luminance value for each object and the predefined luminance value for objects of that classification indicates the object as rendered may have unnatural and/or inconsistent luminance values.

Embodiments are further enabled to render the final HDR game image with visual indicators superimposed on the unnatural and inconsistent HDR objects. Thereafter, embodiments may stop processing the HDR images and return control to the content creator to determine the next course of action (e.g., manual correction of the object luminance values). In another embodiment, however, the luminance values of the unnatural and inconsistent HDR objects may be automatically adjusted to match the predefined value corresponding to the HDR object classification, and a preview of the final HDR game image rendered on the display (along with the visual indicators to flag such objects for review). Thereafter, the content creator may examine the preview rendered of the HDR objects and determine whether the automatic luminance adjustments should be accepted, rejected, or modified.

These and further embodiments of a real-time HDR content reviewer may be implemented in various ways. For example, FIG. 1 depicts an example HDR content review system 100 including an HDR luminance corrector 106, according to an embodiment. As shown in FIG. 1, system 100 includes a computing device 102 and a display device 108. Computing device 102 includes a content editor tool 104 executing on the computing device which in turn includes a luminance corrector 106. Other structural and operational embodiments will be apparent to persons skilled in the relevant art(s) based on the following discussion regarding system 100 of FIG. 1.

A general description of embodiments follows herein below described in the context of system 100 and computing device 102 of FIG. 1. It should be understood that although described in terms of a computing device 102 operated by a user, embodiments are not limited to that scenario or computing hardware. For example, embodiments may operate semi or completely autonomously in a variety of hardware environments including, but not limited to, graphics processing units ("GPUs") and other types of computing hardware. It should also be noted that although description of embodiments herein is often couched in terms of HDR images and video processed in the context of video games, embodiments may usefully be employed to review and correct luminance values in any type of HDR content.

Computing device 102 of system 100 may include any type of computing device whether mobile or stationary, such a desktop computer, a server, a video game console, etc. Computing device 102 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone®, a phone implementing the Google® Android™ operating system, etc.), a wearable computing device (e.g., a head-mounted device including smart glasses such as Google®, Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

In an embodiment, content editor tool 104 executing on computing device 102 enables a content editor, game developer, or other qualified personnel to perform a review of HDR content for mismatched luminance values of the nature described herein above. In an embodiment, luminance corrector 106 included in content editor tool 104 enables manual, semi-automated or fully automatic review and correction of incorrect luminance values in the following general manner.

Figure 2:
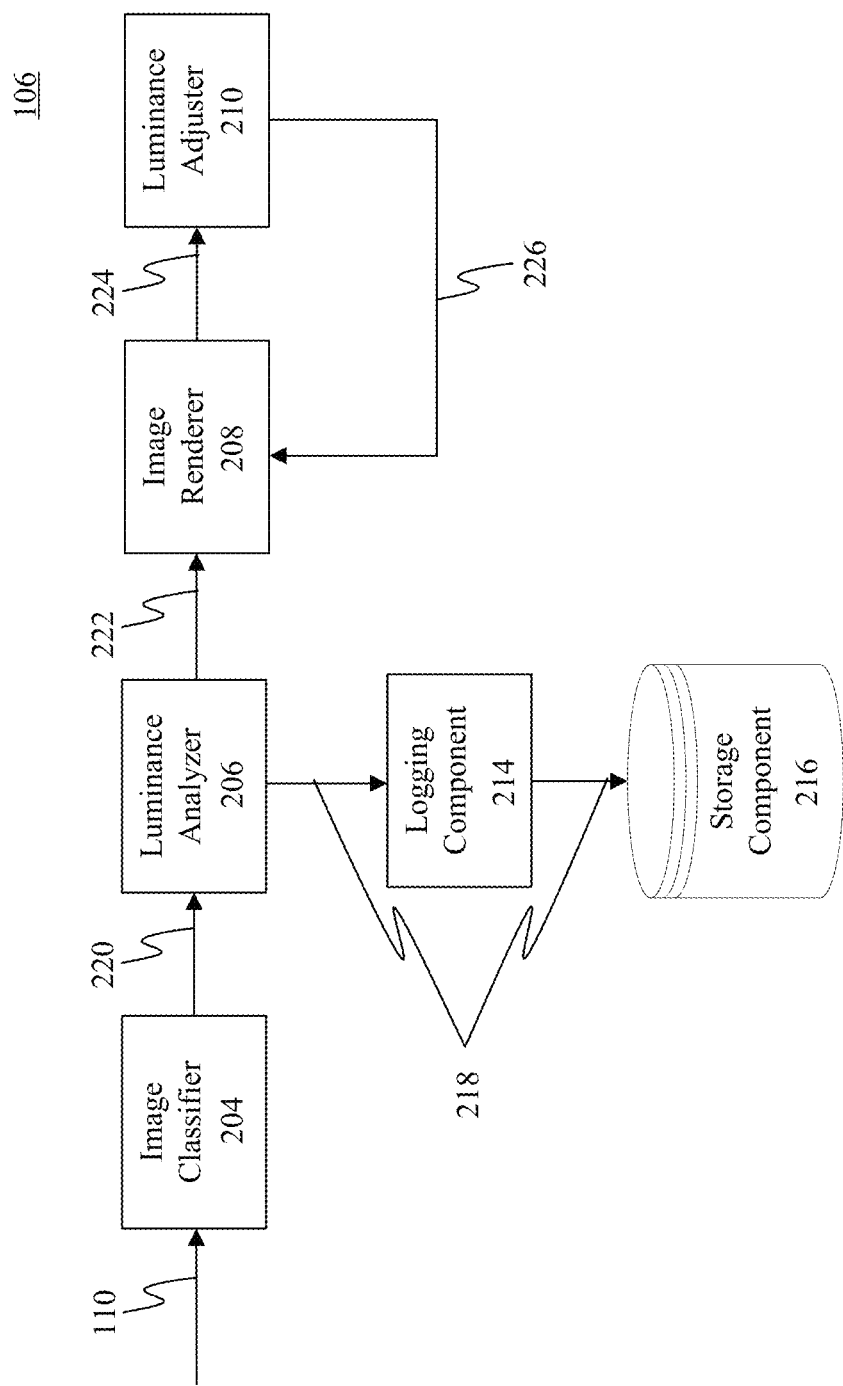
FIG. 2 depicts an example luminance correction system, according to an embodiment.

As an initial matter, video or still images including HDR content for review may be provided to content editor tool 104 of computing device 102 for display and review on display device 108. For example, HDR image 110 may be loaded or otherwise accessed by content editor tool 104, and rendered on display device 108. Once accessible by luminance corrector 106 of content editor tool 104, HDR video and/or images such as HDR image 110 may have incorrect luminance values detected and corrected in embodiments by operation of the following general steps as discussed in turn below:

Identify and classify bright regions
For each such bright region:
    determine a luminance value for the region
    compare the determined luminance value to a predefined luminance value corresponding to the bright region classification
    Optionally: Render visual indicators atop the bright regions needing correction
    Optionally: write a log file with a list of the bright areas with inappropriate luminance levels, together with a screenshot of the image/frame containing the visual indicator
    Accept a manually or automatically generated corrected luminance value for the bright region
    Correct the bright region luminance according to the corrected luminance value Embodiments of luminance corrector 106 of FIG. 1 may be configured in various ways to perform such operations. For example, FIG. 2 depicts an embodiment of luminance corrector 106. As shown in FIG. 2, luminance corrector 106 includes an image classifier 204, a luminance analyzer 206, an image renderer 208, a luminance adjuster 210, a logger 214 and a storage component 216. Luminance corrector 106 is described in further detail as follows.

In embodiments, HDR image 110 is received by image classifier 204. Image classifier 204 is configured to thereafter identify and classify bright regions contained in images (including video), such as HDR image 110. As an initial matter, embodiments of image classifier 204 must determine whether there is a bright region in a scene, where the region is located, its size, and an identification of the bright region (e.g., a campfire such as bright region 112). Image classifier 204 may be configured in various ways to perform these functions, including performing such identification and classification according to a machine vision, image recognition, or other algorithm for identifying objects in images. Examples of such algorithms include convolutional neural networks, appearance-based methods (e.g., edge matching, divide-and-conquer search, greyscale matching, histograms of receptive field responses, large model bases), feature-based methods (e.g., interpretation trees, pose consistency, pose clustering, invariance, geometric hashing, scale-invariant feature transform (SIFT), speeded up robust features (SURF)), genetic algorithms, etc. As described in more detail below, machine learning ("ML") algorithms may be usefully employed for such identification and classification tasks. In embodiments, a suitably trained machine learning model included in image classifier 204 may be provided with the image under inspection (e.g., HDR image 110), and produce a list of bright regions 220, including their location, size and classification. Example HDR and SDR images of embodiments will now briefly be discussed, and discussion of luminance corrector 106 as depicted in FIG. 2 will continue thereafter below.

Figure 3:
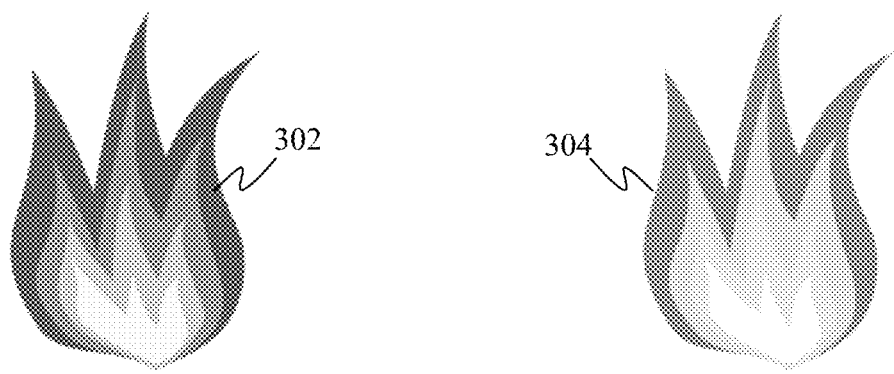
FIG. 3 depicts two instances of example HDR content of the same classification in the same image as created by two different content creators but with different luminance values, according to an embodiment.

For example, FIG. 3 which depicts example HDR content image 300 including content items 302 and 304 having the same classification. In particular, content items 302 and 304 are each a bright region in content image 300 and are both classified as "fires." As shown in FIG. 3, content item 302 was created to have an average fire HDR brightness of 500 nits. Content item 304, on the other hand, was created by a different content creator to have an average fire HDR brightness of 1000 nits. As discussed above, these HDR brightness values represent the intended brightness for each portion of content when natively displayed on an HDR capable display device. The difference between 500 and 1000 nits of brightness is excessive such that this difference would be noticed by a human viewer on an HDR display device. Such mismatches in content brightness in an image may arise, as mentioned above, due to the use of SDR displays by each content creator.

Figure 4:
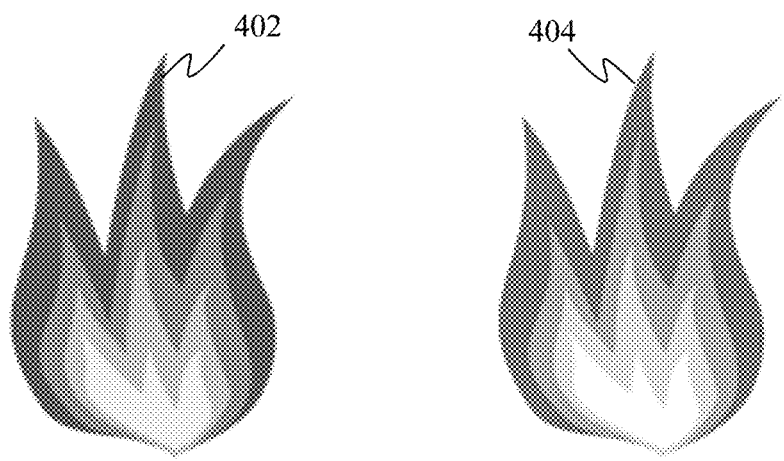
FIG. 4 depicts an SDR rendering of the example HDR content of FIG. 3 after SDR tone mapping is applied, according to an example embodiment.

Consider, for example, FIG. 4 which depicts an SDR rendering of the example HDR content image 300 of FIG. 3 into an SDR image 400 after SDR tone mapping is applied, according to an example embodiment. Because SDR display devices are not physically capable of displaying the full range of luminance values that may be encoded in an HDR image, the luminance values of the image must be scaled to fit in the dynamic range of the SDR display device. This scaling process is generally referred to as tone mapping. Scaled HDR content 402 and 404 of FIG. 4 illustrate what content items 302 and 304 may look like after SDR tone mapping, and when displayed on an SDR display device. Although tone mapped SDR content 402 and 404 do indeed have visibly different luminance values (i.e., SDR content 402 appears slightly less bright than SDR content 404), the differences may not be large enough to be noticeable on an SDR display, or may be within a tolerable range of differences for content of the same classification. For this reason, it may appear to one or both of the creators of content items 302 and 304 that the luminance values are satisfactory, and/or are close enough to each other to be essentially the same. The problem arises, however, when HDR content items 302 and 304 are displayed as shown in FIG. 3 where each would appear substantially different from one another.

Returning now to the discussion of luminance corrector 106 as depicted in FIG. 2, please recall that image classifier 204 is configured to identify and classify bright regions in HDR image 110, and produce a list of the bright regions, referred to as bright regions 220, which indicates the location (e.g., by upper leftmost pixel coordinates, center pixel coordinates, etc.), size (e.g., a rectangle or other shape identified as a two-dimensional array of pixel coordinates), and classification of each bright region (e.g., by classification name, classification identifier, etc.).

In embodiments, the list of bright areas 220 is received by luminance analyzer 206. Each of the bright areas indicated by bright areas 220 is analyzed by luminance analyzer 206 to determine an overall luminance value for the bright area. Luminance analyzer 206 may be configured to perform such analysis in numerous ways, including histogram analysis of color values, operations on monochromatic values, averaging values, and so forth. For example, embodiments may set the overall luminance value according to the peak RGB (red-green-blue) value of the bright region (i.e., largest of R G or B values) or the peak average value (i.e. largest of R+B+G/3 for each pixel). Alternatively, embodiments may plot a histogram of luminance values in the bright region and set the luminance value for that region to be the median value of the histogram. In other embodiments, perceptual adjustment factors may also be applied to account for the non-linearity of human perception of brightness.

After determining the luminance values for each bright region, embodiments of luminance analyzer 206 are configured to compare each determined luminance value with a predefined luminance value corresponding to the bright region classification as reflected in the list of bright regions 220. For example, a luminance value may be predefined for each class of bright region that may be encountered in the HDR content. In particular, a game designer or content editor may predefine luminance values for, e.g., a fire, explosion or sun to be 1000, 3000 or 10000 nits, respectively. Thus, embodiments of luminance corrector 106 may detect bright region 112 of HDR image 110, classify bright region 112 as a fire, and determine its luminance value to be 500 nits. In this example, upon comparing the value of 500 nits with the predefined value of 1000 nits, embodiments of luminance analyzer 206 determines the luminance for that bright region for correction. After performing the above described comparison on each detected and classified bright region of bright regions 220, luminance analyzer 206 is configured to generate a list of bright regions requiring correction as incorrect bright regions 222, along with their locations and dimensions.

After determining the bright regions in need of correction, embodiments may perform corrections in a number of ways. For example, in one embodiment, image renderer 208 receives incorrect bright regions 222, and on a display screen (e.g., on display device 108 of FIG. 1), renders a visualization atop the bright regions (e.g., atop bright region 112 in FIG. 1) to flag such regions for review by a content creator or content editor. Such a visualization may have any suitable form, including a semi-transparent highlighting over the bright region, an appropriately colored bounding box around the bright region, etc. In an embodiment, in addition to rendering visualizations atop the flagged bright regions, embodiments may also apply a provisional or suggested luminance adjustment automatically to the bright regions. Alternatively, image renderer 208 may be configured to provide suggested luminance values 224 to luminance adjuster 210.

In embodiments, luminance adjuster 210 may be configured to operate in different ways depending on the configuration of luminance corrector 106. For example, luminance adjuster 210 may be configured to automatically and permanently apply the provisional or suggested luminance values to the bright regions to produce corrected image 226 including corrections for each bright region. Alternatively, luminance adjuster 210 may be configured to permit review of the previously applied provisional/suggested luminance values, and permit such changes to be rejected or accepted. The latter alternative may be performed for various reasons, such as the machine learning model of image classifier 204 mis-identifying portions of the image as having incorrect luminance values, for artistic reasons why such provisional/suggested luminance values should not be accepted (e.g., when the suggested luminance adjustments are based on physically realistic luminance values, but the HDR image under review is intended to appear "cartoony"), etc. In another embodiment of luminance adjuster 210, suggested luminance values 224 may not be applied to the HDR image as a preview, but instead be presented to the content editor as a suggested luminance value when accepting a manually input luminance correction value from a content editor or developer. Whether correcting luminance values automatically or via manual input, luminance adjuster 210 is configured to apply the corrected luminance value to render a corrected image 226.

In another embodiment, luminance corrector 106 may be configured to operate as an automated image test tool. In such an embodiment, HDR images for review may be provided to luminance adjuster 106 in bulk, with each image being processed by image classifier 204 as described above to generate a list of bright areas 220 for input to luminance analyzer 206, which in turn determines incorrect bright regions 222. In this embodiment, however, incorrect bright regions 222 may or may not be provided to image renderer 208 for an interactive review of the image in the manner described above. Furthermore, luminance analyzer 206 may generate a log 218 of such bright areas needing correction. Log 218 may include the data and metadata regarding each bright region (e.g., location, size, classification, determined brightness), and may include a screenshot of the output of image renderer 208 with visualizations as described above. Logger 214 is may be configured to receive log 218 from luminance analyzer 206, and process log 218 for storage in storage component 216, in an embodiment.

Note, although the above description of embodiments of luminance corrector 106 is couched in terms of lists of various types, it should be understood that embodiments need not produce or store a literal list, and other types of data structures or means of representing the data described with respect to each abovementioned list may be employed. In embodiments, for example, the abovementioned lists may comprise any number of different data structures, whether in memory, or stored in some fashion. Such data structures may comprise, for example, arrays, associative arrays, linked lists, records, objects (including object methods), stacks, queues or graphs.

Figure 5:
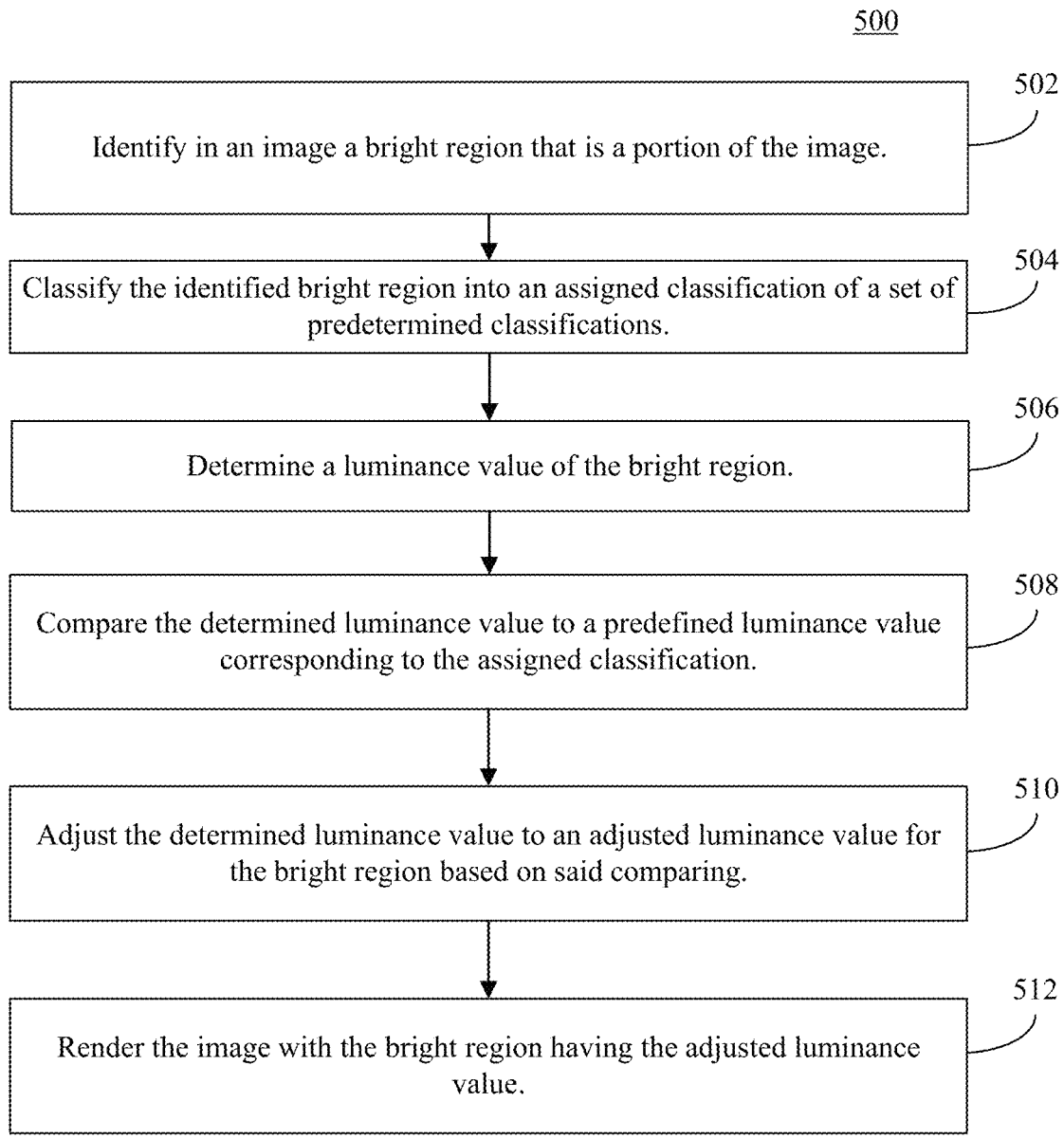
FIG. 5 depicts a flowchart of a method for reviewing and correcting HDR content, according to an embodiment.

Luminance corrector 106 may operate in various ways to perform its functions. For instance, FIG. 5 depicts a flowchart 500 of a method for reviewing and correcting HDR content, according to an embodiment. FIG. 5 is described with continued reference to FIGS. 1 and 4. However, other structural and operational embodiments will be apparent to persons skilled in the relevant art(s) based on the following discussion regarding flowchart 500 and luminance corrector 106 of FIGS. 1 and 4.

As shown in FIG. 5, flowchart 500 begins at step 502. In step 502, in an image, a portion of that image that is a bright region is identified. For example, and with continued reference to FIG. 2, image classifier 204 may identify in an image, such as HDR image 110, one or more bright regions that are portions of the image. As described in above, image classifier 204 may be configured to perform such identification with the use of a suitably trained machine learning model (that is discussed in greater detail herein below). For example, image classifier 204 may identify bright regions 302 and 304 in image 300.

In step 504, the identified bright region is classified into an assigned classification of a set of predetermined classifications. For example, and with continued reference to FIG. 2, image classifier 204 may be configured to perform classification of bright regions identified in HDR image 110 as discussed above, and in further detail below.

Flowchart 500 of FIG. 5 continues with step 506. In step 506, a luminance value of the bright region is determined. For example, image classifier 204 of FIG. 2 may provide luminance analyzer 206 with a list of bright regions (including their location, size and classification) in bright regions 220. As discussed above, luminance analyzer 206 is configured to determine a luminance value for each identified and classified bright region.

In step 508, the determined luminance value is compared to a predefined luminance value corresponding to the assigned classification. For example, and as discussed above with reference to FIG. 2, luminance analyzer 206 may be configured to compare the determined luminance values of the bright regions with predefined luminance values corresponding to the assigned classification. That is, per the example discussed above, luminance analyzer 206 may configured to compare the luminance value determined for a "fire" with the predefined value of 1000 nits. As shown in FIG. 2, luminance analyzer 206 generates incorrect bright regions 222, which includes identified bright regions having luminance values that do not match (e.g., exactly, or within a predetermined threshold) the predetermined luminance values for the classifications of the identified bright regions.

Flowchart 500 of FIG. 5 continues with step 510. In step 510, the determined luminance value is adjusted to an adjusted luminance value for the bright region based on said comparing. For example, and as discussed above with reference to FIG. 2, luminance adjuster 210 is configured to, either automatically or with manual assistance, adjust the luminance values of bright regions identified in incorrect bright regions 222 as needing correction by luminance analyzer 206.

Flowchart 500 of FIG. 5 concludes with step 512. In step 512, the image with the bright region having the adjusted luminance value is rendered. For example, and with continued reference to FIG. 2, luminance adjuster 210 may be configured to apply the necessary luminance adjustments to generate corrected image 226, that may in turn be provided to image renderer 208 for rendering.

In the foregoing discussion of steps 502-512 of flowchart 500, it should be understood that at times, such steps may be performed in a different order or even contemporaneously with other steps. For example, the identifying and classifying of steps 502 and 504, respectively, may be performed simultaneously by the same machine learning model. Other operational embodiments will be apparent to persons skilled in the relevant art(s). Note also that the foregoing general description of the operation of luminance corrector 106 is provided for illustration only, and embodiments of luminance corrector 106 may comprise different hardware and/or software, and may operate in manners different than described above. Indeed, steps of flowchart 500 may be performed in various ways.

Figure 6:
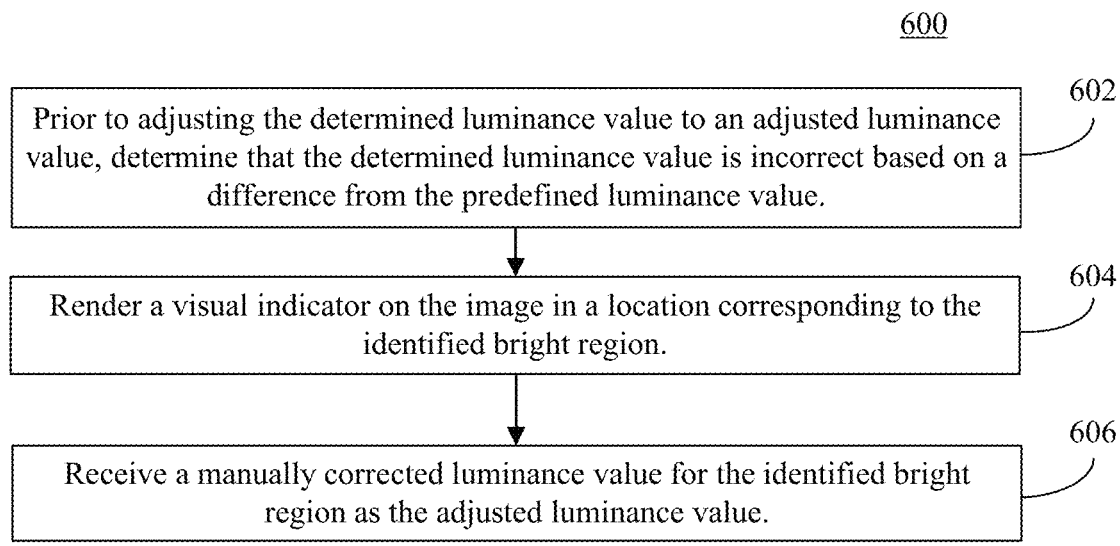
FIG. 6 depicts a flowchart of refinements to the flowchart of FIG. 5 for reviewing and correcting HDR content, according to an embodiment.

For example, FIG. 6 depicts a flowchart of refinements to the method for reviewing and correcting HDR content as depicted in flowchart 500 of FIG. 5, according to an embodiment. FIG. 6 is described with continued reference to FIGS. 1, 4 and 5. However, other structural and operational embodiments will be apparent to persons skilled in the relevant art(s) based on the following discussion regarding flowchart 600 and FIGS. 1, 4 and 5.

As shown in FIG. 6, flowchart 600 begins at step 602. In step 602, prior to adjusting the determined luminance value to an adjusted luminance value, the determined luminance value is determined to be incorrect based on a difference from the predefined luminance value. For example, and with continued reference to FIG. 2, analyzer 206 is configured to compare the luminance values determined at step 506 with predefined luminance values corresponding to the assigned classification. In an embodiment, luminance analyzer 206 may be configured to determine the difference between the luminance values determined for a given bright region, and the predefined luminance value corresponding to the assigned classification. Luminance analyzer 206 may use the determined difference to determine that the luminance value for associated bright region is incorrect where, for example, the determined difference exceeds a predefined threshold either in absolute or percentage terms.

At step 604, a visual indicator is rendered on the image in a location corresponding to the identified bright region in the process of adjusting the determined luminance value. For example, and with continued reference to FIG. 2, image renderer 208 is configured to render a visual indicator in a location corresponding to incorrect bright regions 222 identified by luminance analyzer 206. Such a visual indicator may comprise, for example, a bounding box around the bright region or some other means of illustrating where a correction is needed.

Flowchart 600 concludes at step 606. In step 606, a manually corrected luminance value (i.e., a luminance value accepted via manual input to a user interface from a graphic artist, game developer, other content creator, or other person) is received for the identified bright region as the adjusted luminance value in the process of adjusting the determined luminance value. For example, and as discussed in detail above in relation to FIG. 2, luminance adjuster 210 of luminance corrector 106 is configured to accept either a manually corrected luminance value for each identified bright region, or an automatically generated corrected luminance value. The automatically generated corrected luminance value may, in an embodiment, be used to preview suggested image changes which then may be manually accepted, rejected or altered.

Figure 7:
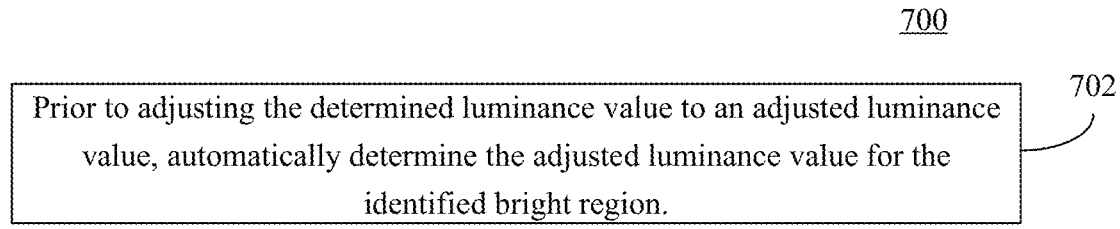
FIG. 7 depicts a flowchart of a method for automatically determining the adjusted luminance value for the identified bright region, according to an embodiment.

FIG. 7 depicts a flowchart 700 of a method for automatically determining the adjusted luminance value for the identified bright region, according to an embodiment. FIG. 7 is described with continued reference to FIGS. 1, 4 and 5. However, other structural and operational embodiments will be apparent to persons skilled in the relevant art(s) based on the following discussion regarding flowchart 700 and FIGS. 1, 4 and 5.

Flowchart 700 of FIG. 7 includes step 702. In step 702, prior to adjusting the determined luminance value to an adjusted luminance value, the adjusted luminance value for the identified bright region is automatically determined. For example, and as discussed in detail above in relation to flowchart 600 of FIG. 6, luminance adjuster 210 of luminance corrector 106 is configured to accept either a manually corrected luminance value for each identified bright region, or an automatically generated corrected luminance value. The automatically generated corrected luminance value may, in an embodiment, be used to preview suggested image changes which then may be manually accepted, rejected or altered. The automatically generated corrected luminance value may, in an embodiment, be generated to match the predefined luminance values that were used by luminance analyzer 206 to determine that the bright region needed correction (i.e., the luminance value associated with the classification).

Figure 8:
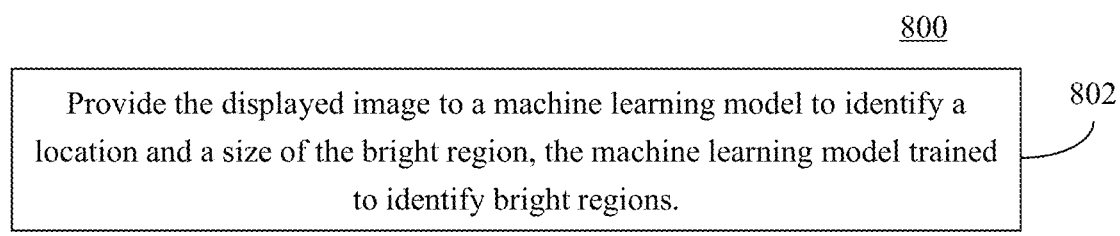
FIG. 8 depicts a flowchart of a method for providing the displayed image to a machine learning model to identify a location and a size of the bright region, the machine learning model trained to identify bright regions, according to an embodiment.

As described above, image classifier 204 may use any of a variety of algorithms for identifying and classifying bright regions. For instance, FIG. 8 depicts a flowchart 800 of a method for a machine learning model to identify and classify bright regions, according to an embodiment. FIG. 8 is described with continued reference to FIGS. 1, 4 and 5. However, other structural and operational embodiments will be apparent to persons skilled in the relevant art(s) based on the following discussion regarding flowchart 800 and FIGS. 1,4 and 5.

Flowchart 800 of FIG. 8 includes step 802. In step 802, the displayed image is provided to a machine learning model to identify a location and a size of the bright region, the machine learning model trained to identify bright regions. For example, and with continued reference to FIG. 2, image classifier 204 may be configured to identify the location and size of bright regions within HDR image 110 through the use of a suitably trained machine learning model as discussed in more detail herein below.

A trained machine learning model suitable for use by image classifier 204 may be generated in various ways. For instance, to generate such a model, a video game may be executed in a machine learning (ML) application, such as TensorFlow™, to generate training data that includes the video stream (or some subset of frames of the video stream) of the video game. Alternatively, movies or other content including HDR content may be played back within the ML application to train a machine learning model. The training phase generates a machine learning model capable of identifying and classifying bright areas in images during live game play, or based on still images excerpted therefrom, or otherwise provided. Alternatively, a machine learning model may be trained on still images excerpted from video games or that otherwise contain bright areas of various positions, luminance intensities and classifications.

The video stream and/or still images provided to the ML application are typically accompanied by other data or metadata ("training indications") that identify the regions of interest in each frame or image (i.e. the classes of HDR content that one wishes the ML model to be able to detect and classify once trained). For instance, training indications may identify the locations, intensities and classification of light sources such as the sun, the moon, fires, explosions, specular highlights, headlights, taillights, license plates and so forth, within each image/frame. In sum, all the various types of light sources in the game, including reflections of the light sources on different types of objects, should be included in the training set. Light sources such as these or others that are determined to be important to particular game scenarios may be flagged during the training phase by a content creator/game developer user (or automatically), such as by indicating their location in the a frame of video or image (e.g., by the user indicating an object's location by a point, by drawing a box around the object, etc.).

In an embodiment, a ML application may be configured to receive and process the training video and/or still images, along with corresponding training indications, to train a machine language model. The ML application may use any suitable techniques to generate the model, including supervised ML model generation algorithms such as supervised vector machines (SVM), linear regression, logistic regression, naïve Bayes, linear discriminant analysis, decision trees, k-nearest neighbor algorithm, neural networks, etc. In an embodiment, the generated model is capable of providing a confidence level indicative of whether a specific class of bright region is identified in a video frame or still image.

After obtaining a suitably trained ML model, embodiments of image classifier 204 (which incorporates the ML model) are provided to the model with scenes, video or still images under development (e.g., HDR image 110) in order to detect and classify the bright areas in the final HDR game image. In an embodiment, and as discussed above, a list 220 of all such detected and classified bright areas (including detail regarding the classification (e.g., fire vs sun vs headlight, etc.), position and size of the bright areas) may be provided to luminance analyzer 206.

Figure 9:
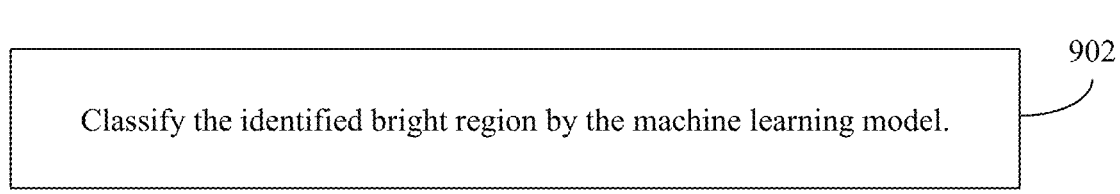
FIG. 9 depicts a flowchart of a method for classifying the identified bright region by the machine learning model, according to an embodiment.

FIG. 9 depicts a flowchart 900 of a method for classifying the identified bright region by the machine learning model, according to an embodiment. FIG. 9 is described with continued reference to FIGS. 1, 4 and 5. However, other structural and operational embodiments will be apparent to persons skilled in the relevant art(s) based on the following discussion regarding flowchart 900 and FIGS. 1, 4 and 5.

Flowchart 900 of FIG. 9 includes step 902. In step 902, the identified bright region is classified by the machine learning model. For example, and as discussed immediately above, image classifier 204 may incorporate a suitably trained machine learning model to perform not only identification of the location and size of bright regions, but also to classify such regions according to their type (i.e., fire vs sun vs headlight, etc.).

III. Example Computer System Implementation

Content editor tool 104, luminance corrector 106, image classifier 204, luminance analyzer 206, image renderer 208, luminance adjuster 210, logger 214, and flowcharts 500, 600, 700, 800 and/or 900 may be implemented in hardware, or hardware combined with software and/or firmware. For example, content editor tool 104, luminance corrector 106, image classifier 204, luminance analyzer 206, image renderer 208, luminance adjuster 210, logger 214, and flowcharts 500, 600, 700, 800 and/or 900 may be implemented as computer program code/instructions configured to be executed in one or more processors and stored in a computer readable storage medium. Alternatively, content editor tool 104, luminance corrector 106, image classifier 204, luminance analyzer 206, image renderer 208, luminance adjuster 210, logger 214, and flowcharts 500, 600, 700, 800 and/or 900 may be implemented as hardware logic/electrical circuitry.

For instance, in an embodiment, one or more, in any combination, of content editor tool 104, luminance corrector 106, image classifier 204, luminance analyzer 206, image renderer 208, luminance adjuster 210, logger 214, and flowcharts 500, 600, 700, 800 and/or 900 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
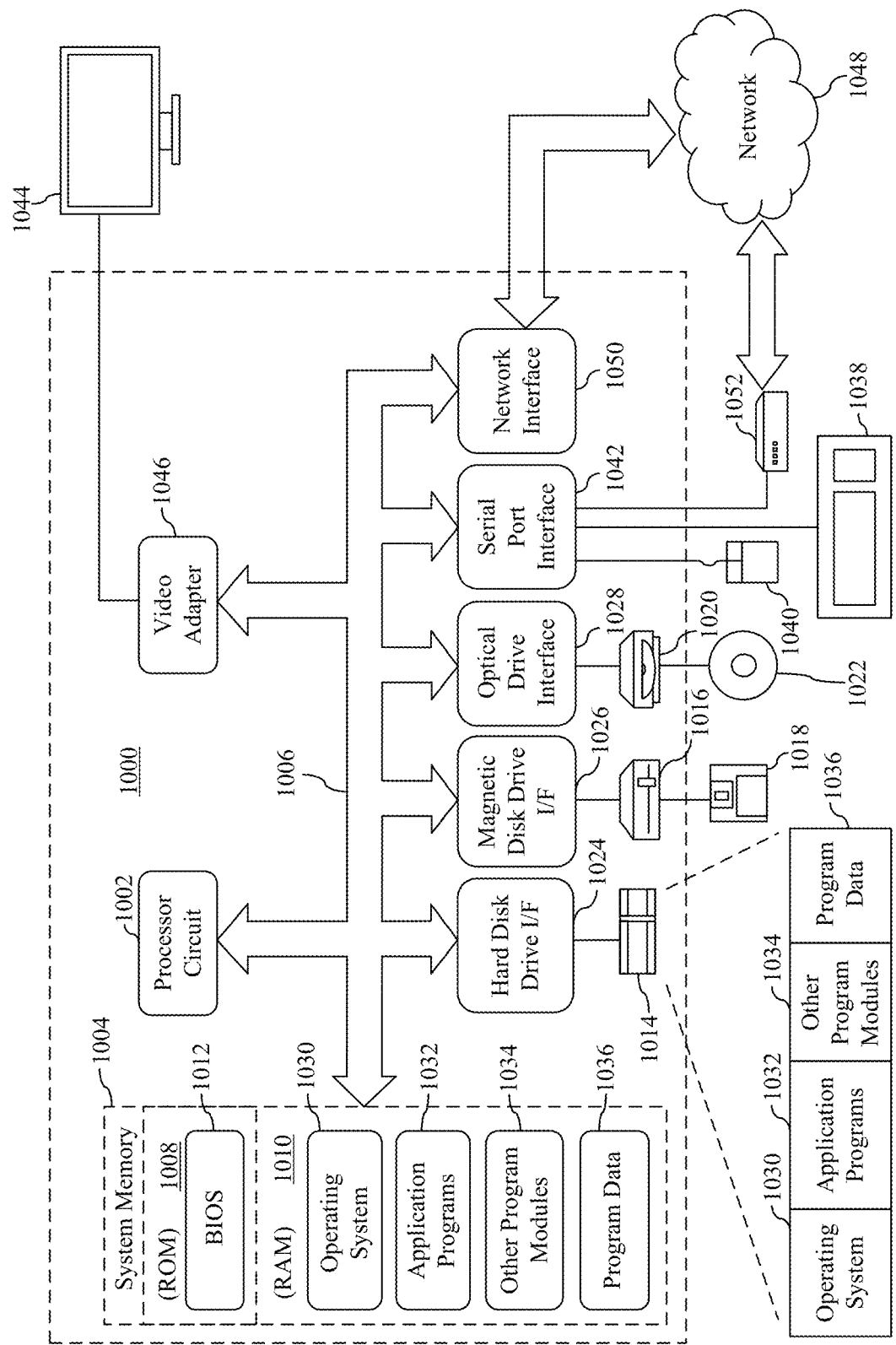
FIG. 10 depicts a block diagram of an example processor-based computer system that may be used to implement various embodiments.

FIG. 10 depicts an exemplary implementation of a computing device 1000 in which embodiments may be implemented. For example, content editor tool 104, luminance corrector 106, image classifier 204, luminance analyzer 206, image renderer 208, luminance adjuster 210 and logger 214 may each be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing content editor tool 104, luminance corrector 106, image classifier 204, luminance analyzer 206, image renderer 208, luminance adjuster 210, logger 214, and flowcharts 500, 600, 700, 800 and/or 900 (including any suitable step of flowcharts 500, 600, 700, 800 and/or 900), and/or further embodiments described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments described herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method is described herein. The method includes: identifying in an image a bright region that is a portion of the image; classifying the identified bright region into an assigned classification of a set of predetermined classifications; determining a luminance value of the identified bright region; comparing the determined luminance value to a predefined luminance value corresponding to the assigned classification; adjusting a luminance value of the identified bright region to an adjusted luminance value based on said comparing; and rendering the image with the identified bright region having the adjusted luminance value.

In one embodiment of the foregoing method, comparing comprises determining the determined luminance value is incorrect based on a difference from the predefined luminance value; and wherein said adjusting further comprises: rendering a visual indicator on the image in a location corresponding to the identified bright region; and receiving a manually corrected luminance value for the identified bright region as the adjusted luminance value.

In an additional embodiment of the foregoing method, adjusting comprises automatically determining the adjusted luminance value for the identified bright region.

In one embodiment of the foregoing method, adjusting comprises adjusting a luminance value of the identified bright region to an adjusted luminance value that is a same luminance value for a second bright region in the image having the assigned classification.

In another embodiment of the foregoing method, rendering comprises applying a linear scale to the adjusted luminance value to account for a visual effect in the displayed image to generate a scaled and adjusted luminance value; and rendering the displayed image with the identified bright region having the scaled and adjusted luminance value.

In an additional embodiment of the foregoing method, identifying comprises providing the displayed image to a machine learning model to identify a location and a size of the bright region, the machine learning model trained to identify bright regions.

In one embodiment of the foregoing method, classifying comprises classifying the identified bright region by the machine learning model.

In another embodiment of the foregoing method, the method further comprises logging information of the identified bright region and information of at least one other bright region in the image for which an adjusted luminance value is determined.

A system is described herein. In one embodiment, the system comprises: one or more processor circuits; one or more memory devices connected to the one or more processor circuits, the one or more memory devices storing: computer program logic for execution by the one or more processor circuits, the computer program logic comprising: an image classifier configured to: identify in a displayed image a bright region that is a portion of the displayed image, and classify the identified bright region into an assigned classification of a set of predetermined classifications; a luminance analyzer configured to determine a luminance value of the identified bright region, and determine a comparison between the determined luminance value and a predefined luminance value corresponding to the assigned classification; an image renderer configured to render the image with the identified bright region having the adjusted luminance value; and a luminance adjuster configured to adjust a luminance value of the identified bright region to an adjusted luminance value based on said comparison, the image renderer further configured to render the displayed image with the identified bright region having the adjusted luminance value.

In one embodiment of the foregoing system, determining a comparison comprises determining the determined luminance value is incorrect based on a difference from the predefined luminance value; and wherein the luminance adjuster is configured to adjust a luminance value of the identified bright region by receiving a manually corrected luminance value for the identified bright region as the adjusted luminance value.

In another embodiment of the foregoing system, the luminance adjuster is configured to automatically determine the adjusted luminance value for the identified bright region.

In an additional embodiment of the foregoing system, the luminance adjuster is configured to adjust a luminance value of the identified bright region to an adjusted luminance value that is a same luminance value for a second bright region in the image having the assigned classification.

In one embodiment of the foregoing system, the image renderer is further configured to apply a linear scale to the adjusted luminance value to account for a visual effect in the displayed image to generate a scaled and adjusted luminance value; and render the displayed image with the identified bright region having the scaled and adjusted luminance value.

In another embodiment of the foregoing system, identifying comprises providing the displayed image to a machine learning model to identify a location and a size of the bright region, the machine learning model trained to identify bright regions.

In an additional embodiment of the foregoing system, classifying comprises classifying the identified bright region by the machine learning model.

In one embodiment of the foregoing system, the system further comprises a logger configured to log information of the identified bright region and information of at least one other bright region in the image for which an adjusted luminance value is determined.

A computer-readable memory device having computer program logic recorded thereon that when executed by at least one processor of a computing device causes the at least one processor to perform operations is described herein. In one embodiment of the computer program product, the operations comprise: identifying in an image a bright region that is a portion of the image; classifying the identified bright region into an assigned classification of a set of predetermined classifications; determining a luminance value of the identified bright region; comparing the determined luminance value to a predefined luminance value corresponding to the assigned classification; adjusting a luminance value of the identified bright region to an adjusted luminance value based on said comparing; and rendering the image with the identified bright region having the adjusted luminance value.

In one embodiment of the foregoing computer-readable memory device, said comparing comprises determining the determined luminance value is incorrect based on a difference from the predefined luminance value; and wherein said adjusting further comprises: rendering a visual indicator on the image in a location corresponding to the identified bright region; receiving a manually corrected luminance value for the identified bright region as the adjusted luminance value.

In another embodiment of the foregoing computer-readable memory device, said adjusting comprises automatically determining the adjusted luminance value for the identified bright region.

In an additional embodiment of the foregoing computer-readable memory device, adjusting comprises adjusting a luminance value of the identified bright region to an adjusted luminance value that is a same luminance value for a second bright region in the image having the assigned classification.

CONCLUSION

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method, comprising:
   identifying, in an image, a bright region that is a portion of the image;
   classifying the identified bright region into a particular classification of a set of different classifications having different predefined luminance magnitudes;
   determining a luminance magnitude of the identified bright region;
   comparing the luminance magnitude of the identified bright region to a particular predefined luminance magnitude for the particular classification of the identified bright region;
   adjusting the luminance magnitude of the identified bright region to an adjusted luminance magnitude based at least on the comparing; and
   rendering the image with the identified bright region having the adjusted luminance magnitude.

2. The method of claim 1, wherein said comparing comprises:
   determining that the luminance value magnitude of the identified bright region is incorrect based on a difference from the particular predefined luminance magnitude; and
   wherein said adjusting further comprises:
      rendering a visual indicator on the image in a location corresponding to the identified bright region; and
      receiving a manually corrected luminance magnitude for the identified bright region as the adjusted luminance magnitude.

3. The method of claim 1, wherein said adjusting comprises:
   automatically determining the adjusted luminance magnitude for the identified bright region.

4. The method of claim 1, wherein said adjusting comprises:
   setting the luminance magnitude of the identified bright region to another luminance magnitude of a second bright region in the image having the particular classification.

5. The method of claim 1, wherein said rendering comprises:
   applying a linear scale to the adjusted luminance magnitude to account for a visual effect in the displayed image to generate a scaled and adjusted luminance magnitude; and
   rendering the image with the identified bright region having the scaled and adjusted luminance magnitude.

6. The method of claim 1, wherein said identifying comprises:
   providing the image to a machine learning model to identify a location and a size of the bright region, the machine learning model trained to identify bright regions.

7. The method of claim 6, where said classifying comprises:
   classifying the identified bright region by the machine learning model.

8. The method of claim 1, further comprising:
logging information of the identified bright region for which the adjusted luminance magnitude is determined.

9. A system, comprising:
one or more processor circuits; and
one or more memory devices connected to the one or more processor circuits, the one or more memory devices storing computer program logic for execution by the one or more processor circuits, the computer program logic comprising:
an image classifier configured to:
identify a bright region that is a portion of an image, and
classify the identified bright region into a particular classification of a set of different classifications having different predefined luminance magnitudes;
a luminance analyzer configured to determine a luminance magnitude of the identified bright region, and perform a comparison between the luminance magnitude of the identified bright region and a particular predefined luminance magnitude for the particular classification of the identified bright region; and
a luminance adjuster configured to adjust the luminance magnitude of the identified bright region to an adjusted luminance magnitude based on said comparison.

10. The system of claim 9, wherein the particular predefined luminance magnitude reflects a peak average luminance magnitude of different colors in the identified bright region.

11. The system of claim 9, wherein the luminance adjuster is configured to automatically determine the adjusted luminance magnitude for the identified bright region.

12. The system of claim 9, wherein the particular predefined luminance magnitude reflects a peak luminance magnitude of a single color in the identified bright region.

13. The system of claim 9, wherein the computer program logic further comprises an image renderer configured to render the image with the identified bright region having the adjusted luminance magnitude.

14. The system of claim 9, wherein the image classifier is configured to provide the image to a machine learning model to identify a location and a size of the bright region, the machine learning model trained to identify bright regions.

15. The system of claim 14, wherein the machine learning model identifies the particular classification of the identified bright region.

16. The system of claim 9 wherein the computer program logic further comprises:
a logger configured to log information of the identified bright region and information of at least one other bright region in the image for which another adjusted luminance magnitude is determined.

17. A computer program product comprising a hardware computer-readable memory device having computer program logic recorded thereon that, when executed by at least one processor of a computing device, causes the at least one processor to perform operations, the operations comprising:
identifying, in an image, a bright region that is a portion of the image;
classifying the identified bright region into a particular classification of a set of different classifications having different predefined luminance magnitudes;
determining a luminance magnitude of the identified bright region;
comparing the luminance magnitude of the identified bright region to a particular predefined luminance magnitude for the particular classification of the identified bright region; and
adjusting the luminance magnitude of the identified bright region to an adjusted luminance magnitude based on said comparing.

18. The computer program product of claim 17, wherein said comparing comprises:
determining that the luminance magnitude of the identified bright region is incorrect based on a difference from the particular predefined luminance magnitude; and
wherein said adjusting further comprises:
rendering a visual indicator on the image in a location corresponding to the identified bright region; and
receiving a manually corrected luminance magnitude for the identified bright region as the adjusted luminance magnitude.

19. The computer program product of claim 17, wherein said adjusting comprises:
automatically determining the adjusted luminance magnitude for the identified bright region.

20. The computer program product of claim 17, wherein said adjusting comprises:
adjusting the luminance magnitude of the identified bright region based on a corresponding luminance value for a second bright region in the image that also has the particular classification.

* * * * *